United States Patent [19]
Liu et al.

[11] Patent Number: 5,905,953
[45] Date of Patent: May 18, 1999

[54] METHOD FOR IMPLEMENTING PRIVATE WIRELESS TELECOMMUNICATIONS NETWORKS

[75] Inventors: Chung-Zin Liu; Kenneth Wayne Strom, both of Naperville, Ill.

[73] Assignee: Lucent Technologies Inc., Murray Hill, N.J.

[21] Appl. No.: 08/759,333

[22] Filed: Dec. 2, 1996

[51] Int. Cl.$^6$ .................................................... H04Q 7/00
[52] U.S. Cl. .......................... 455/433; 455/435; 455/525
[58] Field of Search .................... 455/426, 432, 455/433, 434, 435, 515, 517–520, 524, 525, 406, 408, 411, 415

[56] References Cited

U.S. PATENT DOCUMENTS

| | | | |
|---|---|---|---|
| 5,363,427 | 11/1994 | Elkstrom et al. | 455/426 |
| 5,442,806 | 8/1995 | Barber et al. | 455/435 |
| 5,548,818 | 8/1996 | Sawyer et al. | 455/515 |
| 5,586,338 | 12/1996 | Lynch et al. | 455/433 |
| 5,619,552 | 4/1997 | Karppanen et al. | 455/433 |

*Primary Examiner*—Thanh Cong Le
*Assistant Examiner*—Lester G. Kincaid

[57] ABSTRACT

A wireless telecommunications system is capable of providing both public wireless service and private network service on existing IS-95 CDMA facilities without changes to the air interface or the hardware design. An illustrative embodiment of the present invention comprises: broadcasting an SID/NID signal to a wireless terminal, wherein the SID/NID signal is associated with a set of user zones; receiving from the wireless terminal: (1) an indicium of the wireless terminal's identity, and (2) a request to establish a communications channel based on the SID/NID signal; transmitting the indicium of the wireless terminal's identity to a home location register; receiving from the home location register a prioritized list of user zones based on the indicium of the wireless terminal's identity; and establishing the communications channel based on a first user zone, which first user zone is the user zone that has the highest priority in the prioritized list of user zones and that is also a member of the set of user zones.

9 Claims, 5 Drawing Sheets

| 401 |
|---|
| XYZ COMPANY'S USER ZONES |
| 1 |
| 4 |
| 7 |

*FIG. 5a*

| 403 |
|---|
| ANYTOWN POLICE DEPARTMENT'S USER ZONES |
| 2 |
| 3 |
| 4 |

*FIG. 5b*

| 405 |
|---|
| RESIDENCE'S USER ZONES |
| 1 |
| 6 |

*FIG. 5c*

| MIN (OR DN) | WIRELESS TERMINAL OWNER | PRIORITIZED USER ZONE (HIGHEST PRIORITY FIRST) |
|---|---|---|
| ... | ... | ... |
| 708-112-2345 | KEN | 1 |
| 708-115-2773 | CHUNG | 5, 4 |
| 708-604-7555 | ALICE | 7, 4, 1 |
| ... | ... | ... |

METHOD FOR IMPLEMENTING PRIVATE WIRELESS TELECOMMUNICATIONS NETWORKS

FIELD OF THE INVENTION

The present invention relates to telecommunications in general, and, more particularly, to a method for implementing private wireless networks.

BACKGROUND OF THE INVENTION

As public wireless telecommunications service based on CDMA becomes available, wireless service providers are increasingly interested in offering private wireless network service to select customers. To do this, the wireless service providers have two apparent options: (1) install a separate wireless network to service each private network, or (2) change the existing air interface standards to support both public and private networks and make the concomitant hardware modifications to support the changes in the air interface. Both options are considered undesirable because of the huge expense associated with implementing either option.

SUMMARY OF THE INVENTION

Embodiments of the present invention are capable of providing multiple wireless networks (e.g., a public network and/or one or more private networks) on a single wireless infrastructure without many of the costs and restrictions associated with methods in the prior art. For example, embodiments of the present invention are capable of operation on existing IS-95 CDMA facilities without changing the air interface or modifying existing hardware designs.

These results are obtained in an illustrative embodiment of the present invention that comprises the steps of broadcasting an SID/NID signal to a wireless terminal, wherein said SID/NID signal is associated with a set of user zones; receiving from said wireless terminal: (1) a indicium of said wireless terminal's identity, and (2) a request to register based on said SID/NID signal; transmitting said indicium of said wireless terminal's identity to a home location register; receiving from said home location register a prioritized list of user zones based on said indicium of said wireless terminal's identity; and registering said wireless terminal based on a first user zone, which first user zone is the user zone that has the highest priority in said prioritized list of user zones and that is also a member of said set of user zones.

BRIEF DESCRIPTION OF THE DRAWINGS

A more complete understanding of the invention may be obtained from the consideration of the following description in conjunction with the drawings in which:

FIG. 3 depicts a portion of a flowchart in accordance with an illustrative embodiment of the present invention, which is continued in FIG. 4;

FIG. 4 depicts a portion of a flowchart in accordance with an illustrative embodiment of the present invention, which was begun in FIG. 3; and FIG. 5a is a table depicting user zones supported by a first private network (XYZ Company's private network) in accordance with an illustrative embodiment of the present invention;

FIG. 5b is a table depicting user zones supported by a second private network (Anytown Police Department's private network) in accordance with an illustrative embodiment of the present invention;

FIG. 5c is a table depicting user zones supported by a third private network (Residence's private network) in accordance with an illustrative embodiment of the present invention; and FIG. 6 is a table depicting a mapping of a wireless terminal's MIN, or alternatively a directory number associated with the terminal) to a prioritized list of the user zones available to that wireless terminal, accordance with an illustrative embodiment of the present invention.

DETAILED DESCRIPTION

Figure 1:
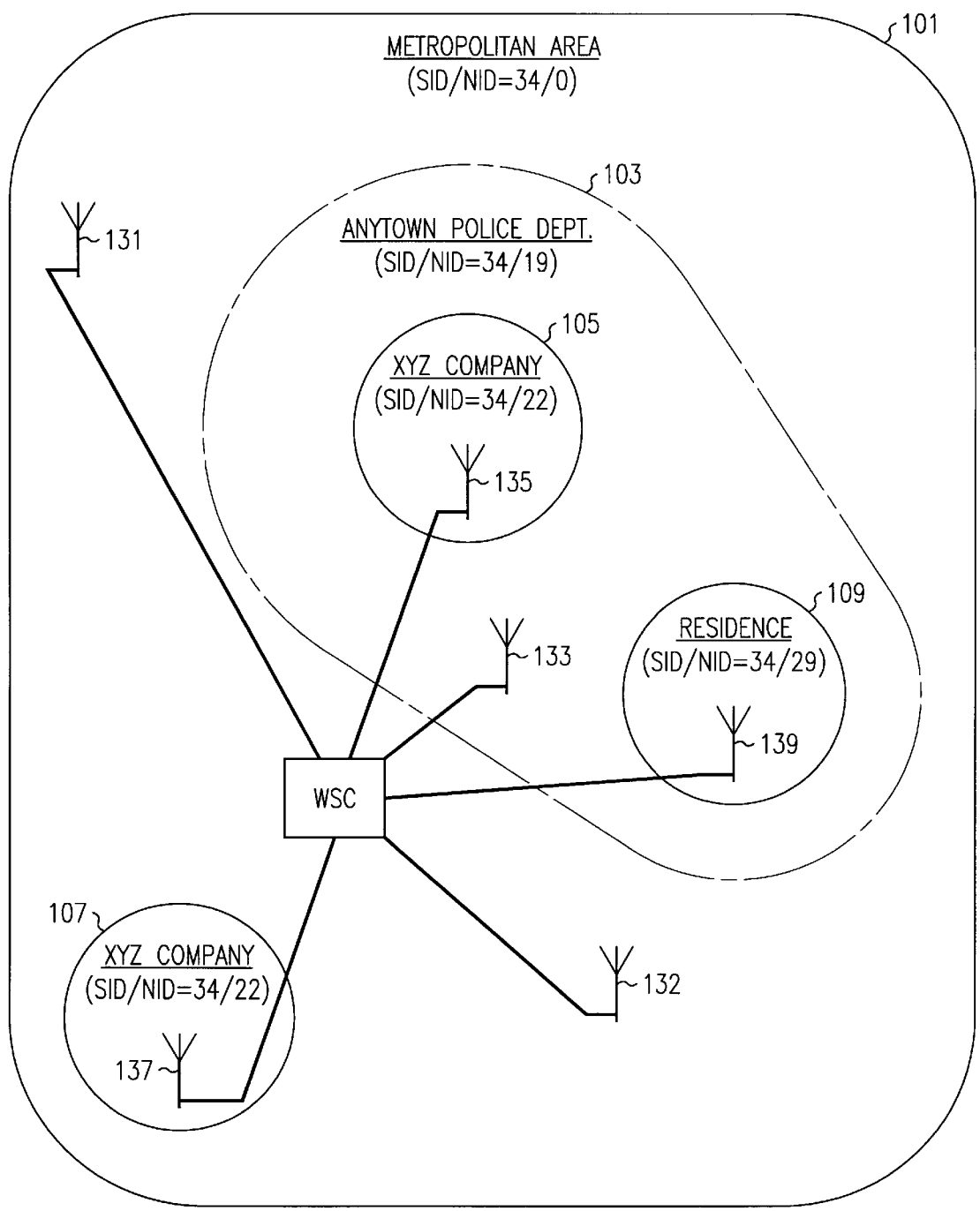
FIG. 1 depicts a map of an illustrative metropolitan area.
Figure 2:
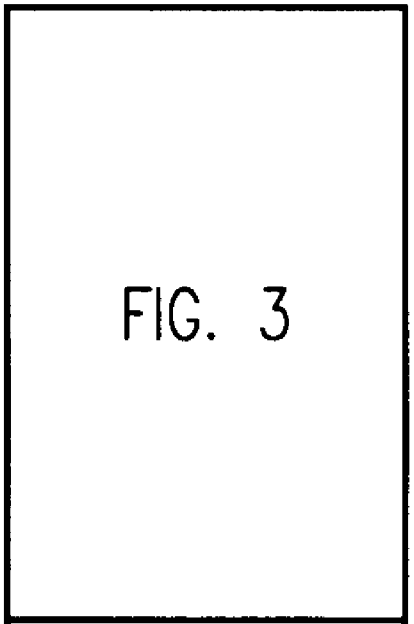
FIG. 2 illustrates how the sheets containing
Figure 2:
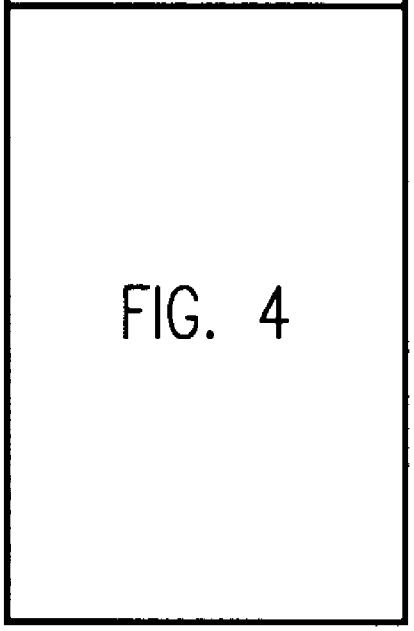

FIG. 1 depicts a map of metropolitan area 101, which is serviced by a wireless telecommunications system in accordance with an illustrative embodiment of the present invention. Within area 101 is region 103, which depicts the area protected by the Anytown Police Department and serviced by the Anytown Police Department's private wireless network. Also within area 101 are campus 105 and building 107, which are owned by the XYZ Company and serviced by the XYZ Company private wireless network. Region 103 also comprises residence 109, which is serviced by its own private wireless network.

In accordance with the illustrative embodiment of the present invention, all of the private wireless networks within area 101 are dependent on the shared use of the wireless telecommunications system's facilities. Also in accordance with the illustrative embodiment, the wireless telecommunication system advantageously also offers public wireless service within metropolitan area 101.

The heart of the wireless telecommunication system that services area 101 is wireless switching center 121. A plurality of wireless base stations, (e.g., base stations 131, 132, 133, 135, 137 and 139) are geographically dispersed throughout area 101 and connected to wireless switching center 121.

In accordance with the illustrative embodiment of the present invention, each CDMA radio associated with each base station in area 101 advantageously broadcasts a System Identification signal and a Network Identification signal on the Overhead Paging Channel. For the purposes of this specification, the combination of a System Identification signal and a Network Identification signal will be called a "SID/NID signal."

In accordance with the IS-95 and ANSI J_STD_008 CDMA air interface standards, the System Identification signal identifies a wireless service provider. For the purposes of this illustration, the System Identification is 34. Although the IS-95 air interface standard provides for a Network Identification signal to be broadcast too, the standard does not strictly restrict how the signal is to be used or interpreted.

In accordance with the illustrative embodiment of the present invention, the combination of the System Identification signal and the Network Identification signal (i.e., the SID/NID signal) are used to partition, geographically and/or logically, a portion of the wireless telecommunications system into multiple wireless networks (e.g. a public network and/or one or more private networks). Therefore, the combination of the System Identification and the Network Identification (i.e., the SID/NID signal) are needed to uniquely identify a given service area. For the purposes of the illustrative embodiment, the Network Identification for the public network is zero (0).

As shown in Table 1, the public wireless telecommunications network and each private network are assigned a unique SID/NID signal.

TABLE 1

| Network | SID/NID Signal |
|---|---|
| Public Network | 34/0 |
| Anytown Police Department Private Network | 34/19 |
| XYZ Company Private Network | 34/22 |
| Residence Private Network | 34/29 |

As shown in FIG. 1, the wireless service provider and each entity sponsoring a private network must decide where, geographically, each private network's service will be available. According to the illustrative embodiment, the Anytown Police Department has decided that its private network should be available to its members when they are within region 103. The XYZ Company has decided that its private network should be available to its employees and customers when they are within campus 105 or building 107. It is important to note that the service area of a network can be adjacent, overlaid or not adjacent to that of another network. The homeowner of residence 109 has decided that his private network should be available to the members of his family only when they are within their residence.

It is preferred that each geographic region serviced by the public network or a private network has one or more CDMA radios in that region that broadcast the SID/NID signal for that network and that provide service for that network. For example, base station 131 within metropolitan area 101 preferably has at least one CDMA radio that broadcasts the SID/NID signal 34/0 on the Overhead Paging Channel. Furthermore, base station 133 within region 103 preferably has at least one CDMA radio that broadcasts the SID/NID signal 34/19 on the Overhead Paging Channel and may also have one or more CDMA radios that broadcast the SID/NID signal 34/0 on the Overhead Paging Channel. And still furthermore, base station 135 preferably has at least one CDMA radio that broadcasts the SID/NID signal 34/22 and may also have one or more CDMA radios that broadcast the SID/NID signal 34/0 and/or the SID/NID signal 34/19. It will be clear to those skilled in the art how to assign radios throughout a geographic region so that multiple virtual networks can be implemented according to embodiments of the present invention.

Also in accordance with the illustrative embodiment, each private network is partitioned into a plurality of "user zones" or "user groups," each of which has an associated set of telecommunications features and restrictions. Each sponsor of a private network must identify what user zones the private network will support, which wireless terminals will be allowed access to the private network and what user zone each wireless terminal will be afforded.

For the purposes of the illustrative embodiment, the wireless telecommunications system offers 9 user zones, numbered one (1) through nine (9). It will be clear to those skilled in the art how to implement and use user zones and how to implement and use the features and restrictions associated with those user zones.

Each sponsor of a private network must decide which of the offered user zones their private network will support, which wireless terminals will be allowed to use their private network and which user zones each wireless terminal will be afforded. FIG. 5a depicts a table 401 indicating which user zones XYZ Company's private network will support.

FIG. 5b depicts a table 403 indicating user zones Anytown Police Department's private network will support.

FIG. 5c depicts a table 405 indicating which user zones Residence's private network will support.

Because access to private networks should be restricted, each wireless terminal contains a prioritized list of the networks that it can access. For example, a user "Alice" has a wireless terminal that contains an indicium of the wireless terminal's identity. That indicium is advantageously the Mobile Identification Number or "MIN." Alternatively, the indicium could be the electronic serial number or "ESN" or the International Mobile Station Identity or "IMSI" of the wireless terminal. The MIN of Alice's wireless terminal is 708-604-7555. Furthermore, Alice has been granted access to the Anytown Police Department's private network and residence's private network. As shown in Table 5, her wireless terminal contains a prioritized list of the networks to which her wireless terminal has been granted access.

TABLE 5

| Network | SID/NID Signal |
|---|---|
| Residence | 34/29 |
| Anytown Police Department | 34/19 |
| Pubiic Network | 34/0 |

A home location register in the wireless telecommunications system advantageously contains a table that maps a wireless terminal's MIN (or alternatively a directory number associated with) to a prioritized list of the user zones that are available to that wireless terminal. FIG. 6 depicts a portion 407 of such a table in accordance with the illustrative embodiment.

The home location register also preferably contains a table that maps a wireless terminal's directory number or MIN to the set of features and restrictions that that wireless terminal is provided. Table 7 depicts a portion of such a table.

TABLE 7

| MIN (or DN) | Privileges | Restrictions |
|---|---|---|
| 564-675-3221 | Flat-rate billing; 4 digit dialing; caller ID; call forwarding; call waiting; three-way calling | None |
| 708-604-7555 | Flat-rate billing; 4 digit dialing; caller ID; call forwarding; call waiting | No international calls |
| 000-345-6678 | Flat-rate billing; 4 digit dialing; caller ID | No intemational calls; no evening calls |
| 000-345-6679 | Flat-rate billing; 4 digit dialing; caller ID | No long distance calls |

And because each user afforded access to a private network on a given user zone should be afforded the same privileges and restrictions, regardless of what privileges and restrictions they would be afforded on the public network, a new table in accordance with the illustrative embodiment is created. As shown in Table 8, this table maps User Zones to a "pseudo"directory number" which is a directory number that can never naturally occur according to the dialing plan. An entry is then made in Table 7 which uses the pseudo directory number as the index to determine what privileges and restrictions the user should be afforded.

TABLE 8

| User Zone | Pseudo Directory Number |
|---|---|
| . . . | . . . |
| 4 | 000-345-6678 |
| 5 | 000-345-6679 |
| 6 | 000-345-6680 |
| . . . | . . . |

Figure 3:
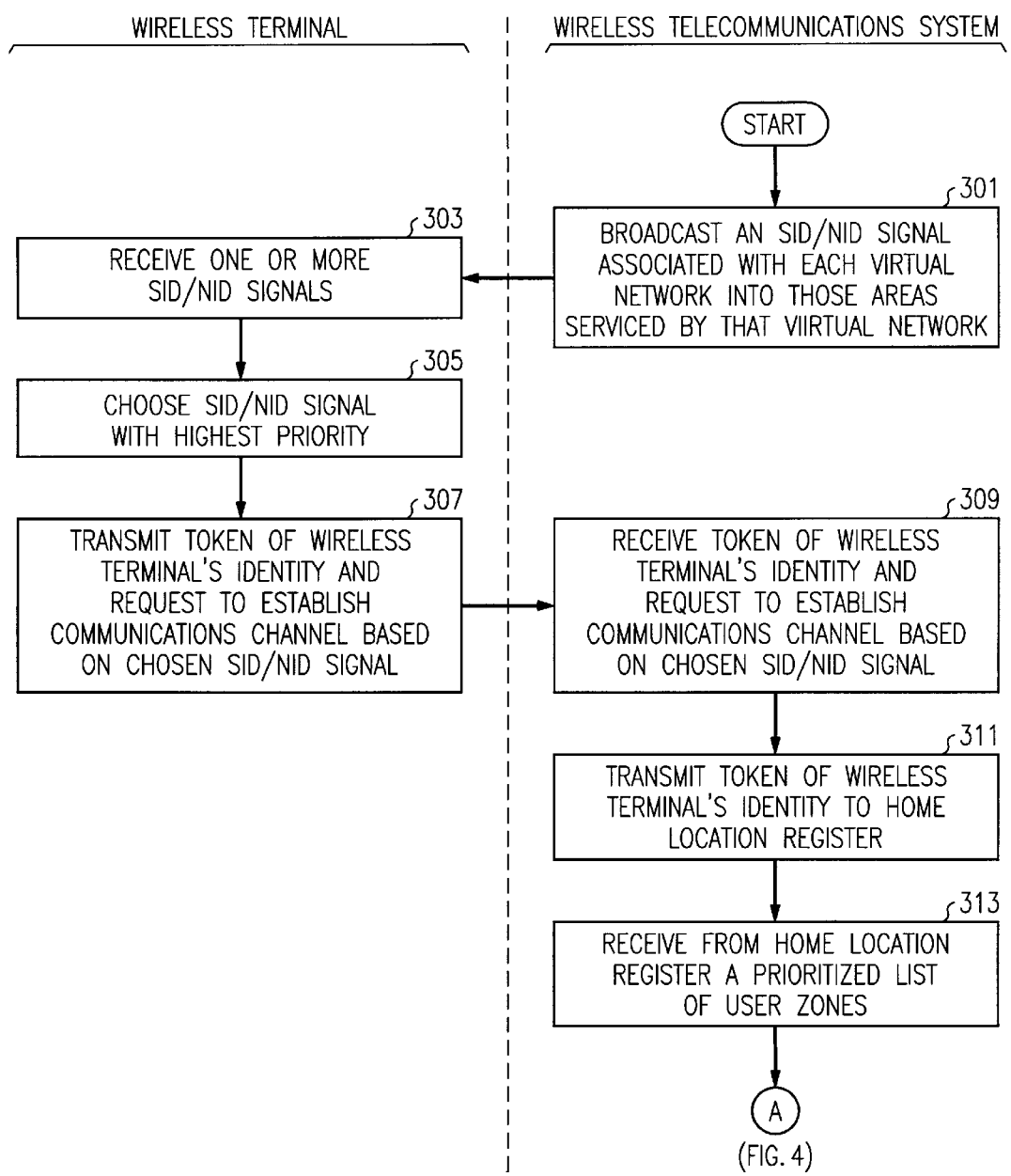
FIG. 3 and FIG. 4 are interrelated.
Figure 4:
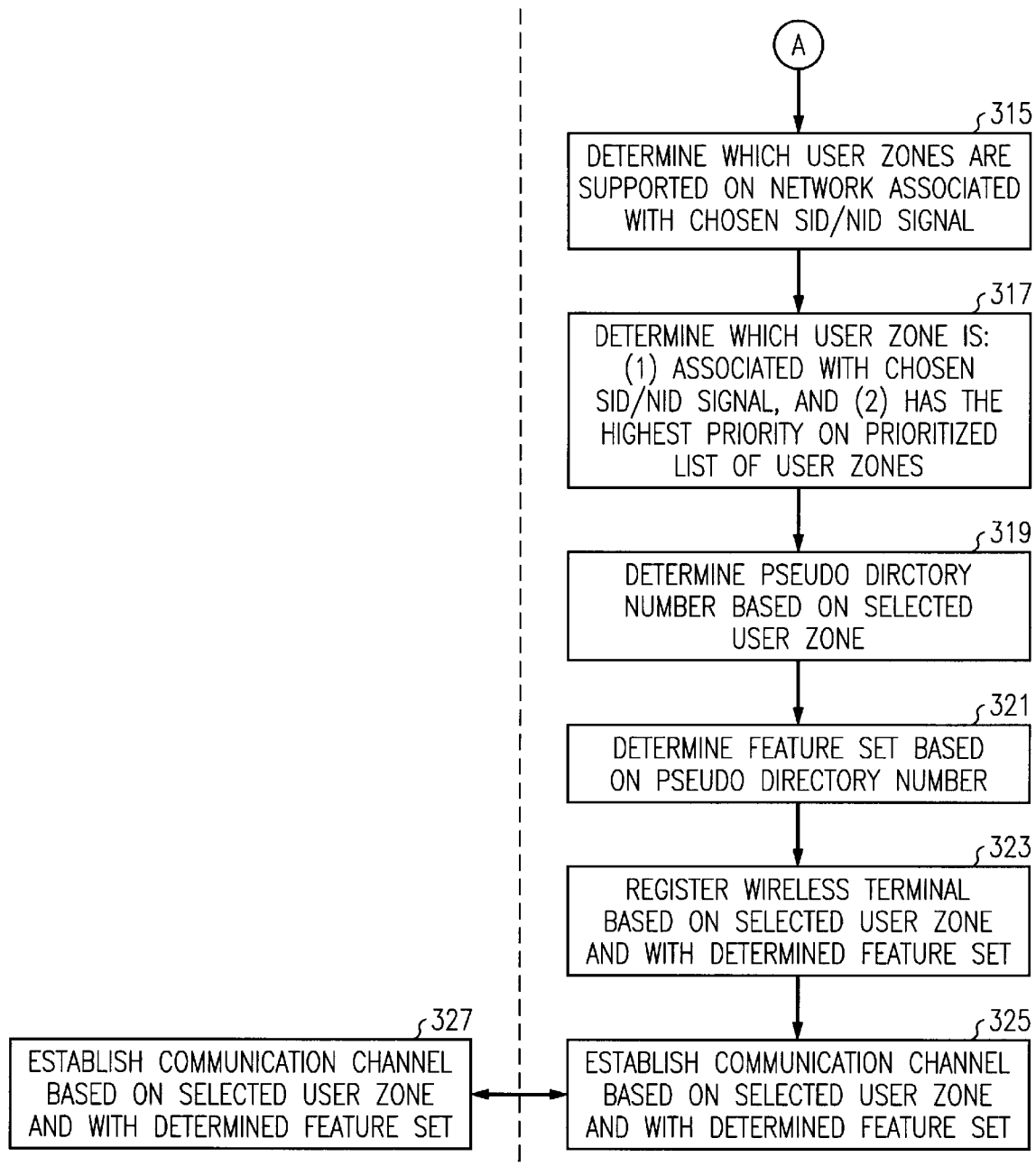

FIGS. 3 and 4 depict a flowchart in accordance with the illustrative embodiment of the present invention. For pedagogical purposes, the illustrative embodiment of the present invention will be described in terms of how it operates to provide service to the user "Alice" when she is within campus 105.

It can be observed from the above tables that Alice has been granted User Zone 7 access to Anytown Police Department's network and User Zone 1 access to Residence's private network. As shown in Table 5, Alice's wireless terminal, which has the MIN 708-604-7555, has been programmed to attempt access to, in order of priority: Residence's private network, Anytown Police Department's private network, and then the public network. Alice has not been granted access to the XYZ Company's private network.

As shown in FIG. 3 at step 301, the wireless telecommunication system broadcasts an SID/NID signal associated with each virtual network into those areas serviced by that virtual network on the Overhead Paging Channel. Specifically, one or more CDMA radios at base stations 131, 132, 133, 135, 137 and 139 broadcast the SID/NID signal 34/0 throughout area 101 to indicate the availability of public wireless service throughout area 101. One or more CDMA radios at base stations 133, 135 and 139 broadcast the SID/NID signal 34/19 throughout region to indicate the availability of service on the Anytown Police Department's private network. One or more CDMA radios at base stations 135 and 137 broadcast the SID/NID signal 34/22 throughout campus 105 and building 107 to indicate the availability of service on the XYZ Company's private network. And one or more CDMA radios at base station 139 broadcast the SID/NID signal 34/29 to indicate the availability of service on the residence's private network.

Because Alice is within campus 105, her wireless terminal receives, via the Overhead Paging Channel, three SID/NID signals: 34/0, 34/19 and 34/22. According to Table 5, Alice's wireless terminal's first preference is to access Residence's private network (i.e., SID/NID signal 34/29). But since her terminal does not receive that SID/NID signal, it must check the availability of her second choice, which is Anytown Police Department's private network (i.e., SID/NID signal 34/19). Because her wireless terminal does receive SID/NID signal 34/19, her wireless terminal choses it, as shown at step 305.

Alice's wireless terminal then transmits (1) a indicium of said wireless terminal's identity, preferably its MIN, and (2) a request to establish a communications channel based on SID/NID signal 34/19.

At step 309, the wireless telecommunications system receives the indicium of the wireless terminal's identity (MIN=708-604-7555) and the request to establish the communications channel based on SID/NID signal 34/19.

At step 311, the wireless telecommunications system transmits the indicium of the wireless terminal's identity (MIN=708-604-7555) to that terminal's home location register. In response, the system receives from the home location register a prioritized list of user zones. From Table 6 above, we can see that the prioritized list for Alice's wireless terminal is "7,4, 1."

At step 315, the wireless telecommunications system determines (from Table 3) that the Anytown Police Department's private network supports user zones 2, 3 and 4. At step 317, the system determines which of the supported user zones has the highest priority on Alice's prioritized list. The highest priority user zone on Alice's prioritized list is 7. But since that user zone is not supported by the Anytown Police Department private network, it is not used. The next highest priority user zone on Alice's prioritized list is 4, which is supported by the Anytown Police Department network.

Next, in accordance with step 319 and Table 8, a pseudo directory number is determined. Because it has been determined that the user zone for this communication channel is User Zone 4, Table 8 provides the pseudo directory number 0000-345-6678. In accordance with step 321, the pseudo directory number 000-345-6678 is advantageously used as an index into Table 7 to determine the feature set that the communication channel with Alice's wireless terminal will be afforded. From Table 7, it can be seen that the call should be afforded flat-rate billing, 4 digit dialing and caller ID, but that there should be no international or evening calls.

In accordance with step 323, the wireless telecommunications system registers the wireless terminal based on the selected user zone, User Zone 4 and with the determined feature set, in well known fashion.

In accordance with steps 325 and 327, a communication channel is subsequenly established based on the selected user zone, User Zone 4, and the above feature set.

It is to be understood that the above-described embodiment is merely an illustrative principle of the invention, and that many variations may be devised by those skilled in the art without departing from the scope of this invention. It is, therefore, intended that such variations be included within the scope of the claims.

The invention claimed is:

1. A method comprising the steps of:

broadcasting a combination System Identification and Network Identification signal (_SID/NID signal_) to a wireless terminal, wherein said SID/NID signal is associated with a set of user zones;

receiving from said wireless terminal: (1) an indicium of said wireless terminal's identity, and (2) a request to register said wireless terminal based on said SID/NID signal;

transmitting said indicium of said wireless terminal's identity to a home location register;

receiving from said home location register a prioritized list of user zones based on said indicium of said wireless terminal's identity; and registering said wireless terminal based on a first user zone, which first user zone is the user zone that has the highest priority in said prioritized list of user zones and that is also a member of said set of user zones.

2. The method of claim 1 further comprising the step of establishing a communication channel with said wireless terminal.

3. The method of claim 2 further comprising the step of offering a set of features to said wireless terminal based on said chosen user zone.

4. The method of claim 3 wherein said communication channel is based on CDMA.

5. The method of claim 1 wherein said indicium of said wireless terminal's identity is a mobile identification number.

6. A method comprising the steps of:
broadcasting a first combination System Identification and Network Identification signal (_(SID/NID signal_) to a wireless terminal, wherein said first SID/NID signal is associated with a first set of user zones;
broadcasting a second SID/NID signal to said wireless terminal, wherein said second SID/NID signal is associated with a second set of user zones;
receiving from said wireless terminal: (1) a indicium of said wireless terminal's identity, and (2) a request to said register said wireless terminal based on said first SID/NID signal;
transmitting said indicium of said wireless terminal's identity to a home location register;
receiving from said home location register a prioritized list of user zones based on said indicium of said wireless terminal's identity; and
registering said wireless terminal based on a first user zone, which first user zone is a user zone that has the highest priority in said prioritized list of user zones and that is also a member of said first set of user zones.

7. The method of claim 6 further comprising the step of establishing a communications channel with said wireless terminal.

8. The method of claim 7 wherein said communications channel is based on CDMA.

9. The method of claim 6 wherein said first user zone is associated with a first geographic region and said second user zone is associated with a second geographic region.

* * * * *